United States Patent [19]
Hicks, Jr.

[11] Patent Number: 4,720,160
[45] Date of Patent: Jan. 19, 1988

[54] OPTICAL RESONANT CAVITY FILTERS

[75] Inventor: John W. Hicks, Jr., Northboro, Mass.

[73] Assignee: Polaroid Corporation, Cambridge, Mass.

[21] Appl. No.: 625,543

[22] Filed: Jun. 28, 1984

Related U.S. Application Data

[63] Continuation-in-part of Ser. No. 331,052, Dec. 16, 1981, abandoned.

[51] Int. Cl.$^4$ .................. G02B 6/26; H01S 3/30; H04B 9/00; G02F 1/00
[52] U.S. Cl. .................. 350/96.15; 350/96.16; 350/96.29; 350/96.30; 350/96.10; 372/6; 372/94; 372/97; 372/72; 370/3; 455/601; 455/602; 455/610
[58] Field of Search .............. 350/96.10, 96.11, 96.12, 350/96.15, 96.16, 96.20, 96.29, 96.30; 372/6, 69, 70, 71, 72, 92, 93, 94, 97, 98; 370/1, 2, 3, 4; 333/212; 455/600, 601, 606, 609, 602, 610

[56] References Cited

U.S. PATENT DOCUMENTS

| | | | |
|---|---|---|---|
| 3,208,342 | 9/1965 | Nethercot, Jr. | 350/96.29 |
| 3,244,075 | 4/1966 | Richards et al. | 350/96.20 |
| 3,308,394 | 3/1967 | Snitzer et al. | 350/96.29 |
| 3,354,405 | 11/1967 | Bebb et al. | 372/6 |
| 3,406,358 | 10/1968 | Seidel et al. | 350/96.12 |
| 3,408,131 | 10/1968 | Kapany | 350/96.15 |
| 3,589,794 | 6/1971 | Marcatilli | 350/96.10 |
| 3,644,016 | 2/1972 | Macken | 350/96.20 |
| 3,666,348 | 5/1972 | Marcatili | 350/96.10 |
| 3,760,297 | 9/1973 | Thompson | 350/96.15 |
| 3,777,149 | 12/1973 | Marcatili | 350/96.10 |
| 3,950,707 | 4/1976 | Hill et al. | 330/4.3 |
| 3,957,341 | 5/1976 | Taylor | 350/96.15 |
| 4,006,964 | 2/1977 | Mahlein et al. | 350/96.15 |
| 4,026,632 | 5/1977 | Hill et al. | 350/96.15 |
| 4,054,366 | 10/1977 | Barnoski et al. | 350/96.15 |
| 4,136,929 | 1/1979 | Suzaki | 350/96.15 |
| 4,253,728 | 3/1981 | Venkatesan | 350/96.15 |
| 4,315,666 | 2/1982 | Hicks, Jr. | 350/96.15 |
| 4,342,499 | 8/1982 | Hicks, Jr. | 350/96.15 |
| 4,429,393 | 1/1984 | Giuliano | 372/21 |
| 4,447,117 | 5/1984 | Bobb | 350/96.15 |
| 4,469,397 | 9/1984 | Shaw et al. | 350/96.15 |
| 4,473,270 | 9/1984 | Shaw et al. | 350/96.15 |
| 4,515,431 | 5/1985 | Shaw et al. | 350/96.15 |
| 4,521,069 | 6/1985 | Ikeda | 350/96.13 |
| 4,546,476 | 10/1985 | Shaw et al. | 372/6 |
| 4,592,043 | 5/1986 | Williams | 370/3 |
| 4,676,583 | 6/1987 | Hicks, Jr. | 350/96.15 |

FOREIGN PATENT DOCUMENTS

| | | | |
|---|---|---|---|
| 0112090 | 6/1984 | European Pat. Off. | 350/96.15 |
| 55-103509 | 8/1980 | Japan | 350/96.15 |
| 2045458 | 10/1980 | United Kingdom | 350/96.15 |

OTHER PUBLICATIONS

Haavisto et al, "Resonance Effects in . . . Ring Waveguides" Optics Lett. vol. 5, No. 12, 12/80 pp. 510–512.

Primary Examiner—William L. Sikes
Assistant Examiner—Brian M. Healy
Attorney, Agent, or Firm—Francis J. Caufield

[57] ABSTRACT

A wavelength filtering device and system in which an optical resonant cavity is laterally coupled to a trunk waveguide carrying a broad range of wavelengths in the optical spectrum. The filtering cavities may be linear optical fiber segments or fiber segments closed at their ends in the shape of a loop. The devices may include single or multiple optical cavities or hybrid filtering utilizing both dispersive and resonant functions.

40 Claims, 32 Drawing Figures

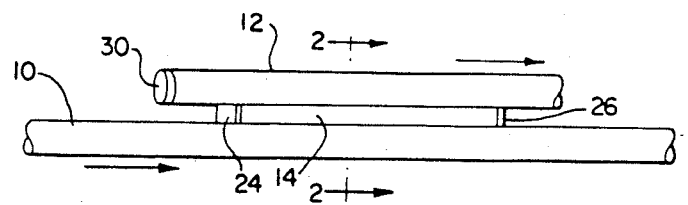
FIG. 1
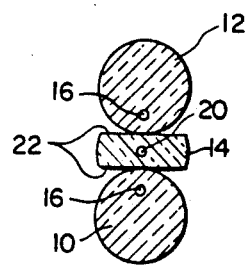
FIG. 2
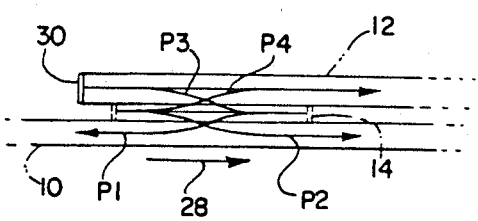
FIG. 3
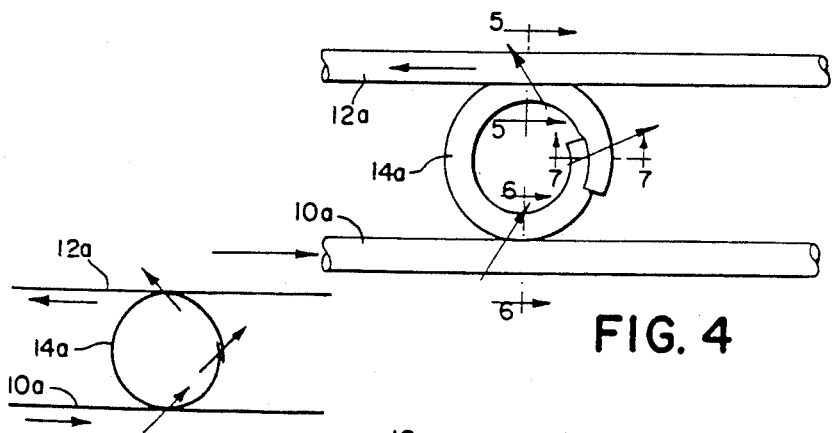
FIG. 4
FIG. 4A
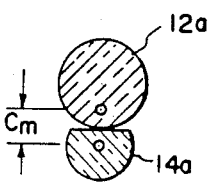
FIG. 5
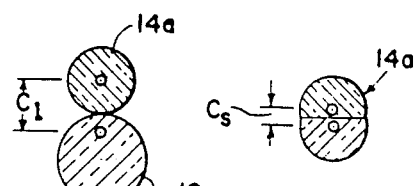
FIG. 6  FIG. 7

OPTICAL RESONANT CAVITY FILTERS

CROSS REFERENCE TO RELATED APPLICATIONS

The present application is a continuation-in-part of U.S. application Ser. No. 331,052, filed Dec. 16, 1981, now abandoned.

BACKGROUND OF THE INVENTION

This invention relates to wavelength filtering in optical waveguide systems. More particularly, it concerns the separation of narrow wavelength bands from a broader spectral region through use of a fiber optics device distinct from the device carrying wavelengths of the broader spectral region.

In commonly owned U.S. Pat. No. 4,342,499 issued Aug. 3, 1982 to the present inventor, tuned, dispersive lateral coupling between two fiber cores has been described. However, the construction of a filter by such means having a bandwidth and less than 0.001 of the central wavelength has proven to be difficult principally due to variation in fiber diameter out of limitations of the drawing process for the fiber device. Although the art of fiber optics drawing is improving rapidly in the attainment of accurate fiber physical characteristics, there is a present need for a filter capable of passing bandwidths of less than one Angstrom in the one to two micron range of the optical spectrum.

Narrow band filtering of the type referred to is useful in a large communications system since the cost of trunk lines is reduced as the number of signal channels per fiber is increased. Still further, the number of possible ports in a switching station goes up as the number of channels per fiber increases. The latter of the foregoing uses for narrow band filter is emphasized by the need for switching to be categorized broadly into two techniques. Commonly, switching requires the crossing of m lines over n in a rectangular matrix and providing switches at each cross-over point. Such a system relies primarily on a very large number of two-position switches.

A second manner of switching utilizes the broadcast by m stations where each broadcast station uses one of many possible "channels". Switching is accomplished by tuning the proper receiving port to the same channel as the selected sending port.

In terms of broadcast switching, a multi-channel transmission line offers an improvement over free space broadcasting since the energy of any channel need not be as great. Channel energy is routed along a common line and remains on that line until it passes a port at which energy is removed. Optical fiber waveguide systems offer an improvement over existing channel broadcast switching stations because of the very large number of channels that can be carried by a single fiber or waveguide line.

If a single mode optical fiber waveguide carries 100 channels spread over 1/10th of the optical spectrum, it will be loaded in terms of bandwidth only when the modulation rate on each channel is around $5 \times 10^{10}$ signal pulses or bits of information per second (assuming the wavelength region to be around 1 micron). However, such high modulation rates are difficult to achieve with present technology. Further, the signal pulses are diffused relatively quickly as they travel along the length of an optical fiber because of group velocity dispersion. Still further, there are few single sources of information with repetition rates higher than video rate. Therefore, to fully load such a 100 wavelength channel fiber, it would be necessary to multiplex in the time domain approximately 10,000 video signals. Apparatus for time domain multiplexing is relatively very expensive and with the present state of the electronics art, it is not possible to do time division multiplexing in packets with video rate signals and trunk rates of $5 \times 10^{10}$ pulses per second. It is barely possible, if at all, at $5 \times 10^9$ pulses per second.

For the above reasons, it would be extremely advantageous to be able to use 10,000 to 100,000 wavelength channels on a single fiber and not require use of time domain multiplexing. To accomplish this, one needs to filter a line width of 1/100,000 to 1/1,000,000 of the base wavelength, which in the one micron wavelength region is in the range of 0.1 Angstrom to 0.01 Angstrom. While the attainment of such narrow filtered line widths in a communication system would be highly desirable, a very useful system would result using a filter with 1 Angstrom line width as opposed to 10 Angstrom width.

There are various applications for wavelength filters, but for operation in the type of system referred to above for illustration, the following requirements must be met:

1. A narrow spectral line must be separated off onto a separate path.
2. The remainder of the wavelength channels must be disturbed as little as possible. For example, if one were to remove one-half the energy in the remainder of the channels, the number of operable receiving ports decreases significantly.

With respect to the second point, it is not necessary to put all n receivers on a single line. The same set of signal bearing channels can be sent along several lines in parallel so that all the receivers do not have to be on the same line. However, there is an advantage in perturbing the unfiltered channels as little as possible and using the fewest number of parallel lines in a switching station.

Another area of use is in a fiber optics distribution system. In such a system, a local switching station addresses a particular receiver on a common distribution line by placing the signal on the wavelength channel to which the receiver is tuned. That is, the receiver has a fixed-tuned line tap which removes one wavelength channel as it passes on the common line. Again, it is desirable to leave the untapped channels as unperturbed as possible. The advantage of increasing the number of channels from 1 to 10 on a local distribution line is enormous and while further increases to 100 or 1,000 channels are decreasingly advantageous they still have merit. Overcoming the problem of devising such a line tap is however a significant accomplishment.

In the existing technology, there are other approaches to narrow line filtering. For instance, the usual choice of optical line filtering means, such as prisms, diffraction gratings, Fabry-Perot interferometers, and the like are available. They all suffer from their geometry. In none of these devices is it easy to get the filtered light onto one fiber and to get the remainder of the light onto another fiber. The Fabry-Perot is the only one named which achieves line widths as low as 1 Angstrom in a small volume.

Resonant cavities are well known in longer wavelength regions of the electromagnetic spectrum, but are an exception within the optical region of that spectrum. Even where resonant cavities are used in the optical part of the spectrum, they suffer from high loss rates per cycle and are not small enough to operate in the 1 Angstrom to 0.01 Angstrom line width range.

Difficulties can be expected in using the fiber device of the invention in the form of a linear resonant cavity having highly reflective metal coatings at the ends, and in attempting single mode operation with butt-coupling to the transmission fibers. The fundamental difficulty is shared with the Fabry-Perot device. That is, the nature of a highly reflective metal surface is such that most of the light which is not reflected will be absorbed. This is inherent in the reflection process for metallic mirrors, and results in a very low efficiency through the butt-coupling at a resonant wavelength. In the case of a Fabry-Perot, this can be avoided by using highly reflective multi-layer dielectric coatings. Such multi-layer mirrors are of necessity not thin compared to the wavelength of light to be reflected. Therefore, they will not be highly efficient on the end faces of a linear fiber cavity resonator, and constitute an undesirable gap in the optical path.

A second difficulty is that the unfiltered remaining light beam is directed back along the same fiber bringing the light to the cavity.

While the above difficulties are alleviated in loop cavities of the invention, a third difficulty is common to all simple resonant cavity devices of this sort. Namely, there are many resonant lines, more or less equally spaced. The condition for resonance is that all of the phase changes resulting from factors which influence the phase of the light during one complete round trip must add up to an integral number of wavelengths. Obviously, if for a given resonant wavelengths, the optical path is 1,000 wavelengths, when there will be another resonant wavelength such that the optical path is 999 wavelength.

This will occur at a change in wavelength of about 1/1,000 of the original wavelength. Instead of filtering off one wavelength, any simple resonant cavity filters off a series of wavelengths.

The ratio of line width (of each resonant wavelength) to spacing between lines (the finesse of the cavity) is approximately proportional to the fraction of energy lost in the course of one round trip. This loss includes reflection losses, scattering, transmission losses, and losses through the input and output ports (assuming the input source is momentarily turned off).

SUMMARY OF THE PRESENT INVENTION

Accordingly, a primary object of the present invention is to provide wavelength filtering by fiber optics means so that narrow bands of wavelengths are separated from a broader spectral region.

A more specific object of the present invention is to provide the above filtering by lateral coupling in relation to an optical resonant cavity.

These and other objects of the present invention are attained in preferred and alternative embodiments of the present invention which feature an optical waveguide, resonant cavity filter (preferably in fiber form) for use in the optical region of 0.2 microns to 3 microns. The resonant cavity device of the invention has comparatively low losses per cycle and is designed to operate in the 0.1 Angstrom to 0.0001 Angstrom line-width range. The invention becomes highly analogous to a Fabry-Perot interferometer by the placing of a highly effective metal coating, such as aluminum or silver, at the ends of a single mode fiber waveguide. Thus, the equations governing Fabry-Perot operation are useful in predicting and analyzing the resonant cavity fibers of the present invention. To avoid a loss in coupling, typically found in end coupling structures, lateral coupling as described in commonly assigned U.S. Pat. No. 4,315,666 issued to the present inventor and incorporated by reference herein, is used as a primary technique for the fiber waveguide in this invention. The types of fibers disclosed therein, represent preferred fiber structures for the present invention.

Alternative embodiments also feature the lateral coupling technique, but in a loop rather than in the linear or non-loop configuration of the first preferred embodiment. A further alternative embodiment also features lateral coupling in a waveguide structure with two stages. The stages may be in the form of closed loop resonators and may be connected either in series or in parallel between input and output waveguides. A still further alternative embodiment is actually a hybrid two-stage filter with a dispersive lateral coupler in combination with a cavity resonator filter.

Other objects, features and advantages of the present invention will become apparent by reference to the following more detailed description of preferred and alternative, but nonetheless illustrative, embodiments, with reference to the accompanying drawings in which like parts are designated by like reference characters.

BRIEF DESCRIPTION OF THE DRAWINGS

FIG. 1 is a fragmentary side elevation illustrating one embodiment of the present invention;

FIG. 2 is an enlarged cross-section on line 2—2 of FIG. 1;

FIG. 3 is a schematic view illustrating energy transfer paths of the embodiment of FIG. 1;

FIG. 4 is a side elevation illustrating another embodiment of the invention;

FIG. 4A is a diagrammatic line drawing of the embodiment illustrated in FIG. 4;

FIGS. 5, 6 and 7 are enlarged cross-sections on lines 5—5, 6—6 and 7—7, respectively, of FIG. 4;

DETAILED DESCRIPTION OF THE PREFERRED EMBODIMENTS

Figure 8:
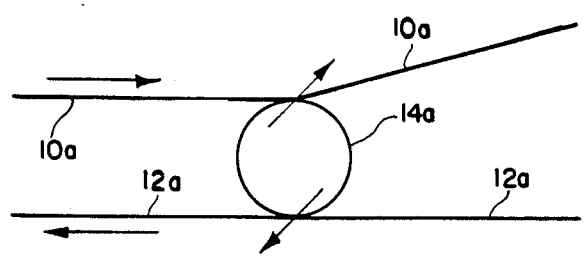
FIG. 8 is a diagrammatic side elevational view illustrating another embodiment of the invention.

A basic form of the present invention is represented by the embodiment illustrated in FIGS. 1-3 of the drawings. In these figures, an optical fiber waveguide 10, such as a single mode fiber of fused silica construction, which might serve as a main line or trunk in a communications system, is coupled along its length to a branch line, represented by another optical fiber waveguide 12, through a resonator 14. Both waveguides 10 and 12 are optical fibers having a core 16 and a cladding 18, the core, in turn, having an index of refraction greater than that of the cladding in accordance with well known optical waveguide technology. The waveguides 10, 12 and 14 may be of a type disclosed in U.S. Pat. No. 4,315,666 which are of rotationally non-symmetric cross-section so that the cores 16 are eccentrically positioned in cladding 18 to facilitate lateral, evanescent coupling at any point along the length of the respective fiber waveguides. Concentric fibers may also be utilized, for example the resonator 14 is preferably an initially circular concentric length of glass fiber having a central core 20 and which has opposed chordal segments removed as by etching or grinding to provide opposite flats 22. As a result of the cross-sectional configuration of the resonator 14, the core 20 thereof is made proximate to the exterior cladding surfaces manifested in the flats 22. Thus, and as shown in FIG. 2, a combination of the fiber structures in the waveguides 10 and 12 together with the proximity of the core 20 in the resonator 14 to the flats 22 thereof provide for efficient lateral coupling between both waveguides 10 and 12 of the resonator 14. Concentric core and cladding fibers having thin cladding (e.g., having an outer diameter to core ratio from 3 to 5) which would produce unacceptable losses in long length may also be used where the fibers are not exposed to an adverse environment.

As shown in FIGS. 1 and 3, the resonator 14 is provided at its ends with reflective arrangements, such as mirrors 24 and 26, to effect an optical resonant cavity in the core 20 ending at opposite ends at the mirrors 24 and 26. The length of the core 20 (for example, 1 cm) between the mirrors will determine the resonant wavelength or frequency of the resonator 14.

Prior to completing the description of the embodiment of FIG. 1, a theoretical description of resonator behavior may be useful.

Figure 22:
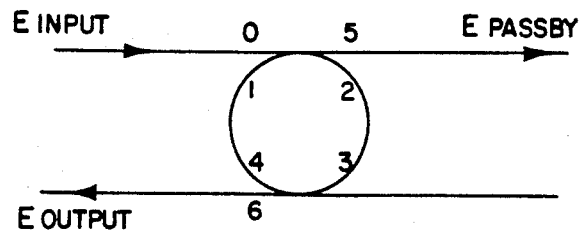
FIG. 22 is a diagrammatic sketch of a loop resonator with marked energy points for a theoretical description of its operation.

The well-known general equations which describe the behavior of optical resonators for example a loop resonator as illustrated in FIG. 22 [having (A) either only one polarization state or one state that does not interact with other possible states, (B) either only one propagation mode or one mode that does not interact with other possible modes or (C) in the case of a ring resonator, either only one sense of rotation, or one sense of rotation that does not interact with and the other sense] are derived by tracing the value of the electric field, starting at some arbitrary point, accounting for every transformation of amplitude and phase produced by path length, losses, gains, couplings in and out, etc., through one complete round trip from and back to the starting point, and setting the final value equal to the initial value.

The ratio of $E_i/E_j$ ($E_i$ and $E_j$ being the electric field vector at points i and j) will generally consist of an amplitude and a phase. I have separated the two, the amplitude appearing as either a transmission factor (T) or a cross couple factor (C) and the phase factor as $e^{i\theta}$.

lateral couple $$E_c = E_a T_{ac} e^{i\theta_{ac}} + E_b C_{bc} e^{i\theta_{bc}}$$
$$E_d = E_b T_{bd} e^{i\theta_{bd}} + E_a C_{ad} e^{i\theta_{ad}}$$

where $T_{ij}$ is the throughput transmission factor of the amplitude and $C_{ij}$ is the cross transmission factor commonly called the coupling strength.

If a fiber segment is analyzed between spaced points a and b, then:

$$E_b = T_{ab} G_{ab} E_a e^{i\theta_{ab}}$$

where $T_{ij}$ is the transmission associated with the amplitude loss and phase change due to transmission from "a" to "b", and $G_{ij}$ is the gain, if it differs from unity, due to amplification between "i" and "j". $\theta_{ab}$ is the phase change from a to b which for a simple fiber section is $2\pi p(L/\lambda)$ where p is the propagation constant, sometimes called "phase index. P is bounded by the index of refraction of the core, $n_1$, and the index of refraction of the cladding, $n_2$, and a simple, circular core fiber operating near cut-off of higher order modes has a p nearly equal $+\frac{1}{2}(n_1+n_2)$.

mirrored end $\underrightarrow{E_r}$ | mirror $E_1$ $$E_1 = E_r T_{r1} e^{i\theta_{r1}}$$

where $T_{r1}$ is the transmission from right to left, ordinarily referred to as "reflectance".

The equations for E internal, E output, and E passby are:

$$E \text{ internal} = E \text{ input} \frac{[P \exp(i\theta)]}{[1 - P \exp(i\theta)]} \frac{[C_{02}]}{[T_{12} \exp(i\theta 12)]} \quad \text{I.}$$

where P is the product of all the amplitude factors for the round trip, i.e., $P = T_{12}T_{23}T_{34}T_{41}G_{23}G_{41}$ and $\theta$ is the sum of all phase changes for one round trip.

$$E \text{ output} = E \text{ input} \frac{[1]}{[1 - P \exp(i\theta)]} [C_{02}C_{36} \exp(i\theta_{23})G_{23}T_{23}] \quad \text{II.}$$

$$E \text{ passby} = E \text{ input } T_{05} + E \text{ internal } C_{15} = \quad \text{III.}$$

$$E \text{ input} \left[ T_{05} + \frac{[P \exp(i\theta)]}{[1 - P \exp(i\theta)]} \frac{[C_{02}C_{15}]}{[T_{12} \exp(i\theta)_{12}]} \right]$$

I will refer to E output/E input (as a function of $\lambda$) as the "transfer function" of the resonator and to E passby/E input as the "passby function" of the resonator. Ideally the transfer function should have a value of unity over the wavelength interval corresponding to a signal channel and a value of zero everywhere else. Further, the passby function should be unity at all wavelengths except in the channel width to be removed and should be zero there.

In the general case there can be more than one input and more than one output and one or more of the $T_{ij}$ factors may represent the transmission past or through another cavity. In this event it is most important to remember that the phase factor associated with the T of another cavity is, far from being independent of $\lambda$, a very rapidly varying function of $\lambda$.

Looking at these equations one can see qualitatively that it is the denominator which produces the typical resonant cavity wavelength dependance. The denominator is composed of a unit vector plus a rotating vector of length TG. The rotating vector has an amplitude less than unity unless there is gain. If there is gain and if it is sufficient to make this vector exceed unity, that is, if the gain exceeds all losses including true losses and coupling outputs, then the device will oscillate and the equation fails, but is still informative. The E internal will increase, even without an input driving signal, until the gain drops to a level where the vector does not exceed unity. The cavity will oscillate, without input signal, at one or more of the wavelengths at which there is a peak output if the gain were insufficient for oscillation.

The rotating vector, $\theta$, will usually, in the absence of coupling to another resonator, be largely determined by the optical path length factor:

$$\theta = 2 \text{ pL}/\lambda$$

If $pL = N\lambda$ where N is a large integer and $\lambda$ changes by an amount $\Delta\lambda$, then $$\Delta\lambda/\lambda = 1/N = \lambda/pL$$

$\theta$ will sweep through $2\pi$. At some $\lambda$ the vector will lie in the opposite direction to the unit vector and at intervals, $\Delta\lambda \approx \lambda^2/pL$, it will again lie in the opposite direction to the unit vector. This $\Delta\lambda$ is commonly referred to as the "free spectral range". Each time the vector lies in the opposite direction to the unit vector, E internal will have a maximum value. Halfway between maxima, E internal will have a minimum value and the $$\frac{E \text{ internal (max)}}{E \text{ internal (min)}} = \frac{1 + P}{1 - P}$$

As P approaches unity, the value of E internal falls very rapidly as $\lambda$ departs from its resonant value. In the limit, the $\delta\lambda$ for which $E(\lambda_r + \delta\lambda)/E(\lambda) = 1\sqrt{2}$ at which point the energy level is down by a factor of 2 is given by $$2 \frac{\delta\lambda}{\Delta\lambda} = \frac{1 - P}{\pi P} = \frac{1}{\text{finesse}}$$

$\delta\lambda$ is the spectral half width at half power of the cavity.

pL, the optical path length, is also defined in terms of optical frequency, f, by the equation, $pL = c/\Delta f$ where c is the velocity of light in vacuo and $\Delta f$ is the free frequency range.

Account must be taken of the $T_{r1}e^{i\theta}r1$ which represent the reflectance of the mirrored ends but the general equations we have used above also describe the straight line resonator. Account must also be taken of the multiple exit ports.

The transfer of energy in the structure of FIG. 1 between the waveguides 10 and 12 through the resonator 14 is represented by four paths or "ports" designated P1, P2, P3 and P4 in FIG. 3. Thus, light energy propagated along the waveguide 10 in the direction of the arrow 28, will pass to and from the resonator 14 along the paths or ports P1 and P2, whereas energy will pass to and from the branch waveguide 12 on the paths or ports P3 and P4. It is basic to this type of resonator coupling that energy output from each possible port will be equal if the ports are equally coupled. For this purpose, each possible loss mechanism can be regarded as a fictitious port. If the ports are not equally coupled, then the light output from each port will be proportional to the energy coupling (or to the square of the amplitude coupling). It is equally basic that at resonance, 100% of the light energy from the input line (in this instance the trunk waveguide 10) will be extracted when the input port energy coupling is equal to the sum of the energy coupling into all of the exit ports, including losses. The energy distribution in the context of providing an output in the branch waveguide 12 having the same direction of the arrow 28 may be improved significantly by the provision of a reflector such as a mirror 30 at the end of the waveguide 12 presented upstream in the context of the desired direction of propagation in the branch waveguide 12. The mirror 30 thus reflects the filtered wavelength traveling to the left in FIG. 3 from port P3. Because of the interference effects, moreover, the amplitudes of the wave traveling to the right in the waveguide 12 and the one reflected from the left will be added. If they are exactly in phase for a wavelength $\lambda_R$ (resonant wavelength) of the optical cavity, the amplitude will be doubled and the energy directed to the right will be quadrupled.

Although it would appear that 4/5 of the light energy will be transferred into the desired branch line path, this is not so principally because of the port P1 giving rise to a reverse direction flow of energy in the input waveguide 10 in light of the equal coupling of the cavity as strongly to the waveguide 10 as to the waveguide 12.

For small coupling per port, the following is approximately true:

$$\text{Energy coupled in} = \frac{4(X_1 + X_2 + X_3 \cdots)}{(1 + X_1 + X_2 + X_3 \cdots)^2}$$

Where $X_i$ is the ratio of the energy (not amplitude) coupling constant of the $i^{th}$ port to the energy coupling constant of the input port.

And further:

$$\text{Energy coupled into the desired ports} = \frac{4(X_{d1} + X_{d2})}{(1 + X_1 + X_2 \cdots)^2}$$

In one case, the first and unmanagable port is the left direction lower port and it is of the same coupling strength as the input port. If we assume no energy losses due to reflection, etc., then the only other output port is the upper combination port. Let the energy coupling efficiency of the combined (interfered) port be $X_d$, then the useful output will be:

$$\frac{4X_d}{(2 + X_d)^2} \text{ which has a maximum at } X_d = 2$$

but it is fairly flat from $X_d = 1$ to 3.

Ideally, then the energy coupled into the upper fiber in one direction should be ¼ as great as the energy coupled in from the lower fiber. Interference raises this to twice the energy coupled from the lower fiber and in this case 50% of the light exits through the upper fiber, 25% to the left through the lower fiber and 25% passes by without being tapped.

More generally, the energy into a useful output port is maximized if the energy coupling into that port is equal to the sum of the coupling coefficient into all the other ports counting the losses as fictitious ports and counting the input port as a port also.

That is, energy into a desired output port is maximized if:

$$X_d = X_{in} + \Sigma X_{losses} + \Sigma X$$

Assuming that all coupling coefficients are small.

The energy output through the desired port near a resonance wavelength is:

$$E_{out} = E_{in} \frac{4 X_d}{[1 + \epsilon X_{loss} + \epsilon X_{other\ ports} + X_d]^2 + \left[\frac{2\pi \frac{\delta\lambda}{\Delta\lambda}}{K^2_{input}}\right]^2}$$

Where $\delta\lambda$ is the displacement in wavelength from a resonant line and $\Delta\lambda$ is the distance between two resonant lines, and $K^2$ is the energy couple coefficient for the input couple. From this, it is obvious that the point at which the energy is half the peak energy is:

$$\frac{\delta\lambda}{\Delta\lambda} = \frac{(1 + X) K^2_{input}}{2\pi}$$

In this case:

(input left + lower output) + (end loss) + (useful output)
$1 + \epsilon X = 1 \quad +1 \quad\quad\quad +2 \quad\quad\quad +4 \quad\quad = 8$ and $K^2_{in} = .01$.

-continued
So at the half energy point:

$$\frac{\delta\lambda}{\Delta\lambda} = \frac{8(.01)}{2\pi} \approx .013$$

The 20% of peak energy point is:

$$\frac{\delta\lambda}{\Delta\lambda} = \frac{2(1 + X)}{2} K^2_{in} \approx .026 \text{ in our example}$$

And the 10% of peak point is:

$$\frac{\delta\lambda}{\Delta\lambda} = \frac{3(1 + X)}{2} K^2_{in} \approx .039 \text{ in our example}$$

If signal channels are placed at a spacing of $0.039\Delta\lambda$, about 10% "cross-talk" will obtain between channels using the filter of FIGS. 1-3, thus enabling the trunk waveguide 10 to handle up to 25 signal channels.

In FIGS. 4-8 of the drawings, variations of single closed-loop optical fiber resonators 14a are shown for transfer of selected wavelengths of light energy from an input or trunk waveguide 10a to a tap or branch waveguide 12a. In each case, the loop 14a is illustrated as both closed by lateral coupling and coupled to the respective input and output waveguides by lateral coupling. However, it should be understood that with the possible exception of the hybrid loop illustrated in FIG. 13, the loops themselves may be closed by butt coupling.

Prior to discussing the just-noted loop resonator systems in detail, it should be noted that the fiber drawings of FIGS. 1, 2 and 4 are disproportionate in order to increase the clarity of the description. However, line drawings have been utilized, as for example in FIGS. 4A and 8-10 to schematically represent the fiber arrangements and provide a more realistic illustration of these structures. The loop resonator system of FIG. 4 is schematically depicted in the line drawing 4A. As seen in both FIGS. 4 and 4A, the arrows designate the wave input and output directions and lateral coupling directions.

It is to be noted that the percentage of energy transfer from one optical fiber waveguide to another through a lateral or evanescent coupling is determined by such parameters of the lateral coupling as length of coupling, proximity of optical waveguide cores at the coupling, and the V number, which as is well known in the art, is determined from the fiber core diameter, numerical aperture and wavelength, and which is a measure of how lightly the wave is bound in the core. Of the several parameters, proximity of the waveguide cores at the lateral coupling is both significant in determining the percentage of energy transfer and in its capability of being controlled, such as by removal of cladding material at the region of the coupling to enable a selection of the percentage energy transfer at the lateral coupling. Thus, and with reference to FIGS. 4-7, the loop resonator 14a is intended to filter and transfer a selected wavelength from the trunk 10a to the branch 12a. As later noted in detail, other orders along with the desired order will also be removed, and further, other wavelengths not of such orders will also be partially removed from the trunk line. Consequently, where a large number of channels in the trunk is desired, it is preferable to minimize the coupling (provide low energy transfer) from the trunk line to the cavity or loop and increase the coupling (provides high energy transfer) from the loop to the branch line. Thus, the input coupling to the loop (see FIG. 6) is made low while the output coupling from the loop (see FIG. 7) is made high so that the energy of the desired wavelength in the branch line is significant while only a small portion of the signal energy of wavelengths other than other orders is removed from the trunk, thereby retaining sufficient energy of such other wavelengths in the trunk for subsequent utilization by downstream taps.

The lateral couplings employed in the embodiment of FIGS. 4 and 4A are shown in FIGS. 5-7. Thus, the lateral coupling of the loop 14a to the input, trunk 10a, is represented by the cross-section in FIG. 6. As shown, the cores of the trunk 10a and of the loop 14a are spaced by relatively large distance $C_1$ representing a low or minimal energy transfer by evanescent coupling between the trunk 10a and the loop resonator 14a. In this way, as little as one to two percent of the energy propagated along the trunk 10a may be transferred to the loop resonator 14a while the remaining 98-99% of the energy will remain in the trunk 10a.

In FIG. 7, the lateral coupling closing the loop 14a is illustrated in which the cores at the lateral coupling so closing the loop are spaced by a distance $C_s$ representing a minimal spacing of the cores and, correspondingly, a maximum transfer of energy passing about the loop resonator of 14a. Similarly, as shown in FIG. 5, in the lateral coupling of the loop 14a to the output, or branch, waveguide 12a, a portion of the cladding on the loop 14a is removed to place the core thereof as close as possible to the core of the branch waveguide 12a without removal of cladding material from the latter. While the core-to-core spacing between the resonator 14a and the branch 12a may be larger than the lateral coupling closing the ends of the loop 14a, it remains a highly efficient energy transfer coupling and provides a relatively high transfer of energy.

The physics and mathematics of a closed loop resonator is similar to the linear resonant cavity described above with reference to FIGS. 1-3. A major advantage of a closed loop resonator, however, is that no backward traveling filtered light will propagate in either of the coupled waveguides. A disadvantage of a closed loop resonator, on the other hand, is that its effective length cannot be made as small as the linear embodiment due to radiation losses incident to a small radius of curvature. In addition, as the diameter of the loop decreases, it becomes more difficult to attain sufficient coupling length between the loop and either of the input and output fibers. Loops having a diameter ranging from 0.5 cm to 5.0 cm are acceptable.

A primary advantage of both linear and closed loop resonators using the lateral coupling scheme described with reference to FIGS. 5-7, is that the filtering of a narrow spectral bandwidth from a trunk, for example, may be achieved while maximizing the amount of energy left undisturbed in the trunk for successive filtering of selected narrow wavelengths along the trunk. In other words, the increased information handling capacity of an optical waveguide trunk resulting from multiple signal channels, each having a very narrow waveband, cannot be realized if the successive filtering of narrow wave bands removes energy from the trunk at each tap in amounts so as to deprive successive narrow bandwidth filters of adequate energy irrespective of the number of wave bands available. In the embodiment of FIG. 4, for example, if one percent of the energy is taken from the trunk by each of a plurality of successive filters 14a, the trunk capacity would be limited to 100 taps, not because of the availability of signal channels, but because of the availability of energy remaining after 99 such taps.

Figure 9:
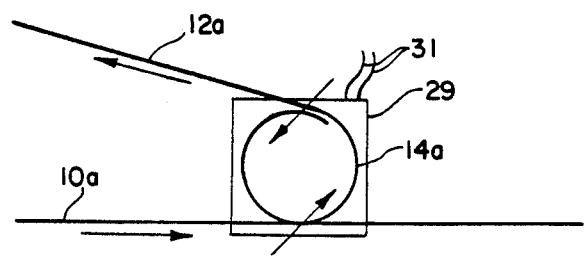
FIG. 9 is a diagrammatic side elevational view illustrating a further embodiment of the invention.

Alternate forms of single loop resonant filters are shown in FIGS. 8 and 9 in which the loop is an integral part of the input and output lines, respectively. In FIG. 8, the input 10a is formed into loop 14a on itself, the loop being laterally coupled to a branch 12a and closed on itself at a lateral coupling effecting less than 100% transfer. An advantage of the embodiment in FIG. 8 is a decrease in energy losses.

In FIG. 9, the end of a branch or output waveguide 12a is closed as a loop 14a for transfer of select wavelengths from the trunk 10a to the branch 12a in a manner similar to that represented by the embodiment of FIG. 4.

In each of the single resonator embodiments thus far described, it will be appreciated that attainment of resonator length is important to realizing the intended results of the present invention in practice. Because of the very short wavelengths of light energy, the resonators, whether linear or circular, must be of a length precisely correlated to the wavelength of light energy to be filtered. Tuning of an optical fiber resonator by variation in the effective length thereof is possible by use of thermal means affecting length by reliance on the thermal coefficient of expansion, for example. The range of tuning sweep, however, is limited.

Figure 10:
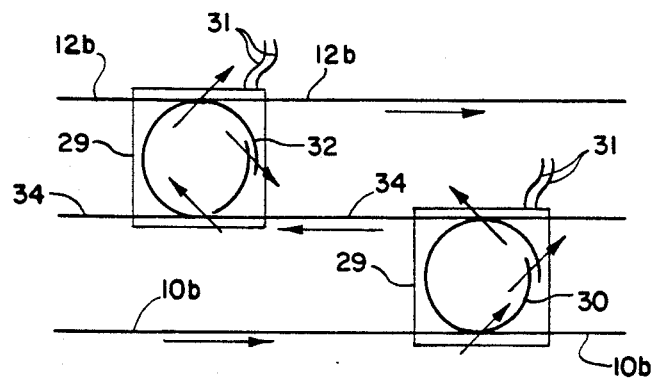
FIG. 10 is a diagrammatic side elevational view illustrating a still further embodiment of the invention.

By way of example, as shown in FIGS. 9 and 10, the loop 14a may be mounted on or cemented to a metal plate 29 which is electrically heated or cooled through electrical leads 31 to provide a dimensional change, i.e. expansion or contraction of itself and of the loop 14a which accordingly tunes the resonant frequency of the loop. Alternately, the plate 29 may be a piezoelectric plate, or the loop may be also immersed in a controlled temperature bath, etc.

As noted previously, transfer of a single wavelength to the branch lines is desired; however, a resonant cavity will, in general, remove and transfer all side orders as well as the intended wavelength. One arrangement for transferring a single wavelength is to utilize a multicavity arrangement as illustrated in FIGS. 10-12.

Figure 11:
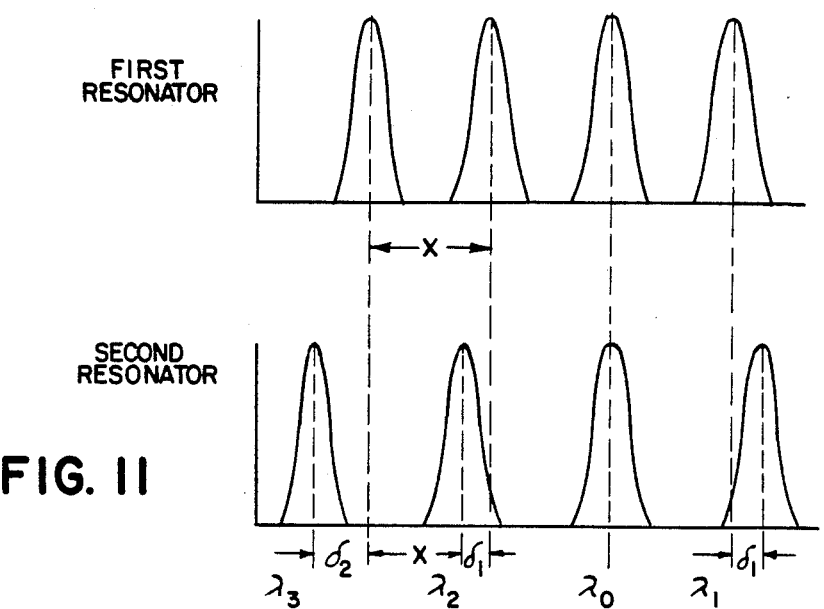
FIG. 11 is a chart representing channels or lines produced by placing two multi-line filters in series, but constructing them to have different line spacings in accordance with the embodiment of FIG. 10.
Figure 12:
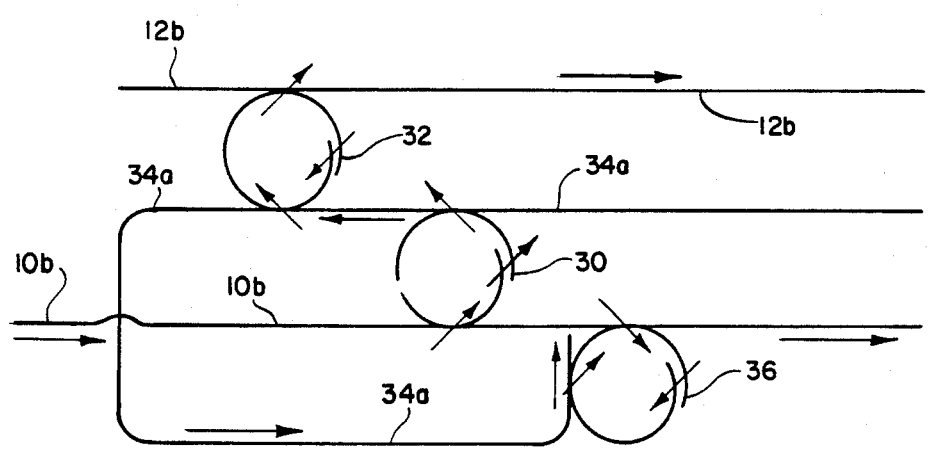
FIG. 12 is a diagrammatic side elevational view representing a variation of the embodiment illustrated in FIG. 10.

The embodiments of FIGS. 10-12 are advantageous from the standpoint of offering a facility of wavelength selection through, in effect, vernier tuning of the resonator system. The wavelength of both resonators of FIG. 10 are depicted in FIG. 11 wherein the spectral line spacings of two (first and second) multi-line filters 30 and 32 are represented graphically. In the first resonator, the line spacing may be represented by the function $(X + \delta_1)$ whereas the line spacing of the second resonator is $(X + \delta_2)$. At a central wavelength $\lambda_0$, both resonators are initially in phase and will function to pass energy at that wavelength. If the first resonator is tuned (for example, by heating) to shift its lines to the right relative to those of the second resonator by an amount $\delta_1$, a different resonant wavelength $\lambda_1$ will coincide in both resonators. A similar shift of equal amount to the left of the first resonator will result in common resonation of the wavelength $\lambda_2$. Shifting of either or both resonator filters to achieve a relative shift in an amount $\delta_2$ will resonate the wavelength $\lambda_2$, etc. Thus, the transferred wavelength can be swept over the full range of wavelength of the input.

If the finesse of the cavity resonator (line width to line-to-line spacing) is 1/100 and if $\delta$ is one and the total tuning shift is 100, 10,000 channels can be reached by holding the relative position and the simultaneous position in each resonator to an accuracy of one part in 100 of the total shift required to tune over the entire range. That is, if $F_1$ is the position of center line of the first resonator and $F_2$ is the position of center line of the second filter, $F_1$ must be held to an accuracy of $\delta$, and $(F_1-F_2)$ to an accuracy of $\delta$. For full range tuning, $F_1$ need only be swept over $100\delta$ and $F_1$ minus $F_2$ over the same range. Thus, it is possible to chose one of 10,000 discrete wavelengths without having more than 100 discrete tunings for each of the two resonators.

The two stage resonator system is tuned by varying one or both cavities 32 and 130 by, for example heating, or piezoelectric plates 29.

A schematic of a two-stage resonator filter for practicing the aforementioned multi-line filter principle is shown in FIG. 10. A first-stage resonator or filter element 30, dimensioned for wavelengths $\lambda_i$, is coupled between a trunk 10a and an intermediate fiber 34. A second-stage filter element 32, dimensioned for a wavelength $\lambda_j$, is coupled to the intermediate fiber or transfer fiber segment 34 downstream of loop 30 as viewed in the direction of its output. The fiber 34 is in the nature of the length of a concentric core optical waveguide represented in crosssection by the fiber 14a in FIG. 6, for example. $\lambda_{ij}$ is the overlap set of wavelengths for the two resonator filters, and this wavelength is coupled through to the output fiber 12b.

It is possible to achieve the above results using a coarse filter in the first-stage 30 and a relatively fine filter in the second stage 32. In this respect, it should be noted, however, that the use of a coarse filter requires that filter to be tuned or swept through $10,000\delta$ to accomplish the desired tuning range. Thus, there are practical limits to the use of a coarse filter in the first-stage filter 30 when tuning over a large channel spectrum is required.

Although the two-stage filter of FIG. 10 is effective to transfer a single wavelength $\lambda_{ij}$ from the trunk 10b to the branch line or output 12b, care must be taken to avoid removal and loss of all of the $\lambda_i$ lines in the trunk 10b. This is particularly true where the first-stage filter is a relatively coarse or broad band filter since those waves taken by the filter 30 from the trunk 10b and not passed to the output 12b are wasted.

A method of using this sequential filtering without depriving downstream taps of energy when they tune to the side orders of the first filter is to remove only a portion of the energy. Thus this sequential filter delivers only a fraction of the energy available on the desired channel but leaves a substantial fraction of the energy in the side orders. The fraction removed is determined by the least power level needed by the receiver and by the expected number of downstream "intersections" on the side orders.

Figure 23:
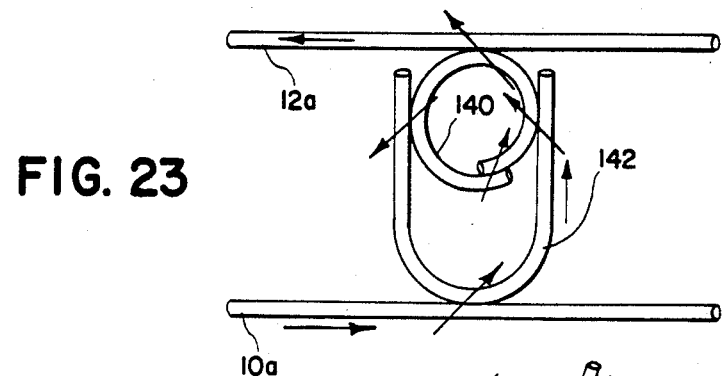
FIG. 23 is side elevational view of an integral parallel coupled two stage filter.

An integral two stage filter is shown in FIG. 23. In contrast to the serial or sequential two stages filters such as shown in FIGS. 10 and 12, for example, the resonators of the integral or parallel two stage filters are intercoupled to each other. In the arrangement of FIG. 23 a closed waveguide loop 140, coupled to a branch line 122, is mounted within and laterally coupled at opposite sides to a waveguide segment 142 which by virtue of its coupling through the loop 140 forms a second resonant cavity loop. The second loop in turn is laterally coupled to the trunk line 10a.

The two loops are adjusted to be co-resonant at a given wavelength so as to pass that wavelength through to the branch line. However, filter 140 will have some true losses and in addition a low ratio of line separation to line width. Nevertheless, the performance of this arrangement is in some aspects superior to a single cavity filter.

Figure 24:
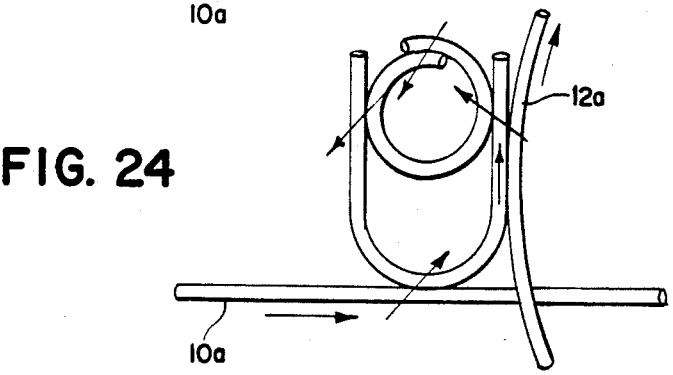
FIG. 24 is an alternate arrangement of the filter shown in FIG. 23.
Figure 25:
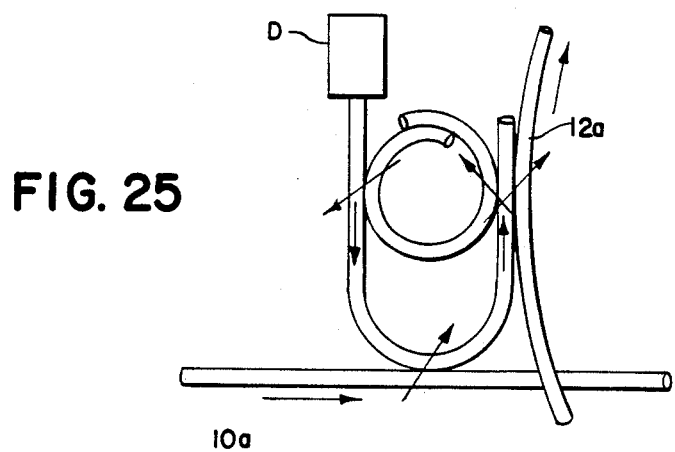
FIG. 25 is a further embodiment of the parallel two stage filter of FIG. 24 employing gain in one of the filter loops.

Some improvement in performance can also be realized in the integral filter of FIG. 23 by coupling the branch line 122 to the outer loop 142 rather than the inner loop 140 as illustrated in FIG. 24. An additional improvement is also provided by introducing gain or amplification into the outer loop 142 as shown in FIG. 25 wherein a laser diode D directs amplifying energy into one end of loop segement 142 in a manner similar to that later described with regard to FIG. 21.

One approach to reducing losses in trunk energy, using a two-stage filter of the type described with reference to FIG. 10, is represented by the embodiment illustrated in FIG. 12. In this embodiment, the same two-stage filter arrangement is represented by the loop resonators 30 and 32. The transfer fiber 34a, however, is extended back and coupled to a third resonator 36 which, in turn, is coupled to the trunk 10a downstream of loop 30, for the purpose of replacing those wavelengths taken from the trunk 10b but not passed by the second-stage filter 32 to the output 12b. While the intended results are obtainable in some measure, there are limitations. For example, the through-put efficiency of the first stage filter 30 can only be brought up to approximately 90% unless gain is used, and even under such circumstances where gain is used to bring it up to 100%, as can be understood from the previous equations the function $\delta\lambda/\Delta\lambda$ is reduced at the 50% point to about $\frac{1}{4}$. Thus, the spectral lines returned to the trunk have been subjected to a filtering action. Also, it will be appreciated that, even if 90% of each of the $\lambda_i$ wavelengths, excluding $\lambda_{ij}$, could be saved by the return loop, which includes the third filter 36, and 81% of those remain after they are reintroduced to the trunk 10b, the number of successive taps from the trunk 10b is still quite limited and, in principle, it is perhaps the untreated filtering which would do the most damage to the returned signals.

An additional alternative to avoiding losses in two-stage filters of the type represented by FIGS. 10 and 12, is to employ the principles of controlled energy transfer described above with respect to FIGS. 5, 6 and 7 of the drawings. In other words, the lateral coupling between the trunk 10b and the first-stage filter 30 may be controlled so that a small fraction of $\lambda_i$ (e.g. 1%) is removed from the trunk (and much less energy of the non-resonant lines) by each first-stage filter 30 in a series thereof along the trunk. Inasmuch as this approach reduces the strength of signal passing to the output, amplification may be required, as later explained with regard to FIGS. 20 and 21.

Figure 13:
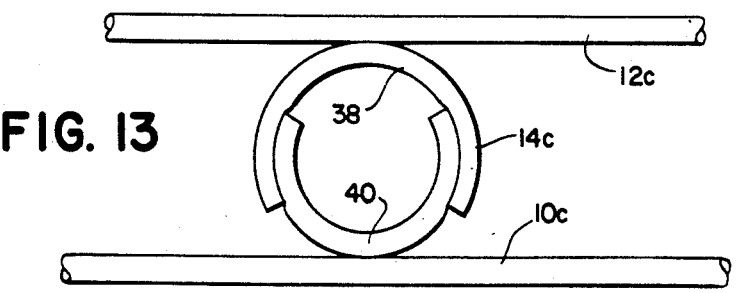
FIG. 13 is a side elevation of another embodiment of the invention representing a two-stage filter, but in a hybrid configuration with a dispersive lateral coupler in a resonant cavity filter.
Figure 14:
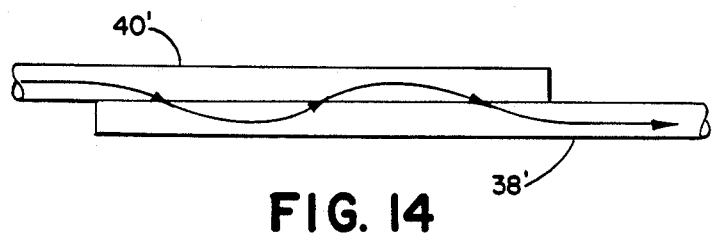
FIG. 14 is a fragmentary view depicting the dispersive lateral coupling used in the embodiment of FIG. 13.

Hybrid two-stage filter embodiments, employing a combined dispersive laterally coupled filter and a resonant filter, are shown in FIGS. 13–16 of the drawings. In a closed-loop variation of this embodiment shown in FIG. 13, a select narrow wavelength of light energy propagated along an input waveguide 10c is transferred to a tap or output waveguide 12c by filter 14c having separate optical fiber sections 38 and 40. The optical fiber structures forming the sections 38 and 40, moreover, are of different physical characteristics (e.g., different core diameters) to produce a different propagation constant or dispersion in each section 38 and 40. As a result, energy will be transferred between the two sections 38 and 40, but only at one wavelength. Thus, the lateral couplings of the two sections 38 and 40 function as wavelength filters apart from the resonant filter constituted by the closed-loop resonator 14c. A linear version of one of the coupling points between the two sections 38 and 40 is shown in FIG. 14. A complete explanation of lateral dispersive couplings of this type is found in commonly assigned U.S. Pat. No. 4,342,499 issued Aug. 3, 1982 to the present inventor, the disclosure of which is incorporated herein by reference.

Figure 13A:
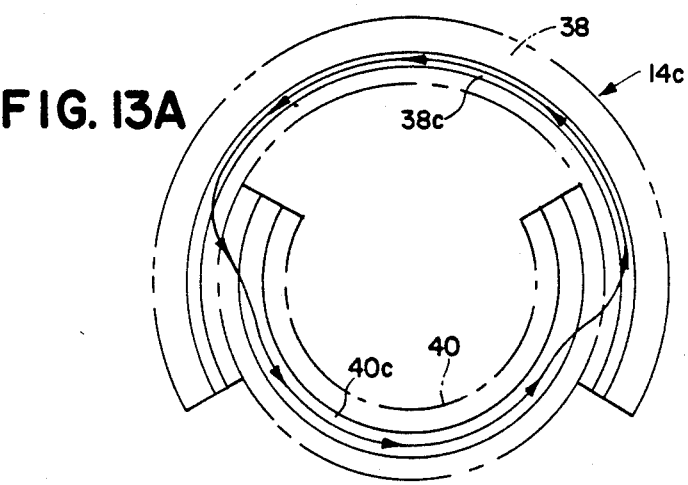
FIG. 13A is a schematic view illustrating the optical path of the embodiment illustrated in FIG. 13.

In FIG. 13A, the hybrid closed-loop resonator 14c is shown schematically with the core 50c of the section 40 larger than the core 38c of the section 38 to represent the different physical characteristics of the two sections 38 and 40. The resonant wavelength of the loop resonator 14c is determined by the composite length or circumferential dimension defined by the two sections 38 and 40. In addition, however, the respective ends of the two sections 38 and 40 are located to determine the coupling length of the two dispersive lateral couplings and also to be at a point at which all the energy for the wavelength of interest is transferred to the other section. As a result, energy at the wavelength of interest sees a continuous path represented by the arrow-head loop in FIG. 13A. For a wavelength slightly displaced from the tuned wavelength, some energy is lost at the open ends of the two sections 38 and 40. Accordingly, the loss resolution in the closed-loop resonant cavity 14c is strongly wavelength dependent.

If a hypothetical wavelength dependent loss is used in the energy expression for energy coupled off the trunk 10c of FIG. 13, if other losses are 0.01 and if the energy coupling factor from the trunk 10c into the overall resonator cavity 14c is 0.002, and if the coupling to the output line is 0.01, energy transferred from the trunk 10c to the output 12c of FIG. 13 will be:

$$\frac{4(5)}{(1 + 5 + 5)^2} = \frac{20}{121} \approx 16\%$$

At the next resonant line, if the loss factor, which is wavelength dependent, is only 0.06, the light coupled off the trunk will be only:

$$\frac{4(5 + 5 + 30)}{(1 + 5 + 5 + 30)^2} = \frac{4}{40} \approx 10\%$$

If it is assumed that the loss factor at the next succeeding resonant line has risen to 0.12, the energy at that wavelength removed from the trunks is only 5.7%, and so on.

Figure 15A:
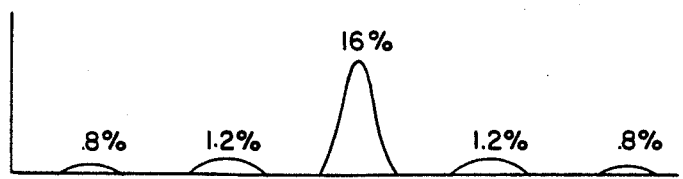
FIGS. 15A–15C are graphs which facilitate an understanding of the operation of the filters illustrated in FIGS. 13 and 13A.
Figure 15B:
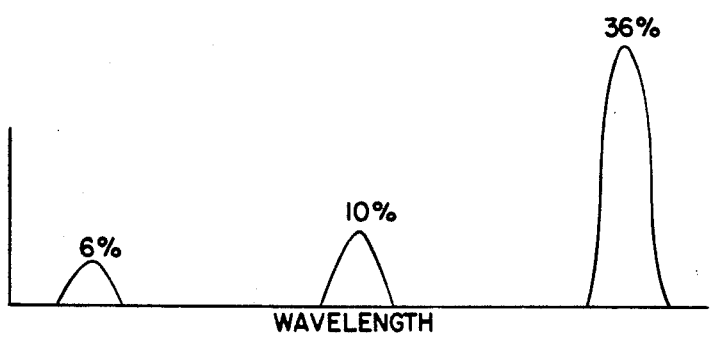
Figure 17:
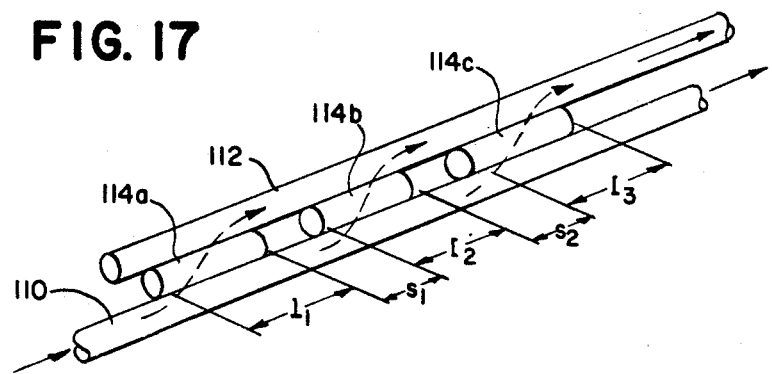
FIG. 17 is a perspective view illustrating still another embodiment of the invention.

What results is an output resembling that shown in FIG. 15A. The operation depicted in FIG. 15A might be further improved by another independent filter, e.g., as illustrated in FIG. 17 and later explained in detail. The light removed from the trunk is then represented by the curves in FIG. 15B which illustrates only the lefthand side of a complete spectrum such as shown in FIG. 15A. With two filters, only 10% of the next adjacent spectral line is removed and 6% of the next and even less from the next. In this way, a large number of single line removal filters can be placed on the trunk. Each one robs its immediate neighbor orders of a little energy, but the end result is that it is limited by the off resonance coupling which is 0.2%. This would allow perhaps 500 such filters in series on a trunk line.

Figure 15C:
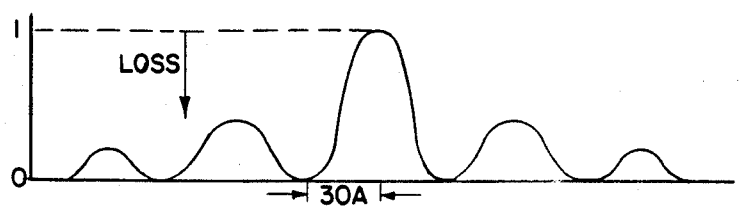

A cetain loss factor was hypothesized. In actual practice, the typical curve for dispersive lateral filters can be used, as illustrated and described in the above-noted U.S. Pat. No. 4,342,499 and as shown in FIG. 15C of the present application. Next, a wavelength scale is needed. A rule of thumb value was given in the above-noted patent for relative dispersion of two cores as: n cos $\theta = \frac{1}{2}(n_1 - n_2)$, where $n_i$ = index of refraction. An $(n_1 - n_2)$ value of 0.01 may be achieved easily and will give dispersion of 0.003.

Therefore, in a dispersive, resonant filter coupler 2 cm. long with a wavelength of 1 $\mu$m, the first null on each side is displaced by about 30 Angstroms. The loss at 5 Angstroms from peak would be about 6%. So, the envelope in this case would be much broader than the one hypothesized, since the line spacing of the cavity resonator (2 cm long) is $\frac{1}{2}$ Angstrom. The curve of removal energy from the trunk would drop to 10% only at the 10th line from center. That situation is not unusable, but it illustrates the need for a relative disperison higher than 0.003. It would be advantageous to have a dispersion of at least 0.1.

Consequently, it is desirable to drop the energy extraction at the central resonant line a little lower and/or to increase the energy available on the trunk line so that even after poaching by neighboring filters, and even after a rather low throughput efficiency, the energy level of the desired wavelength at its point of extraction is adequate for detection. However, even with the parameters given, the system is workable.

Figure 16:
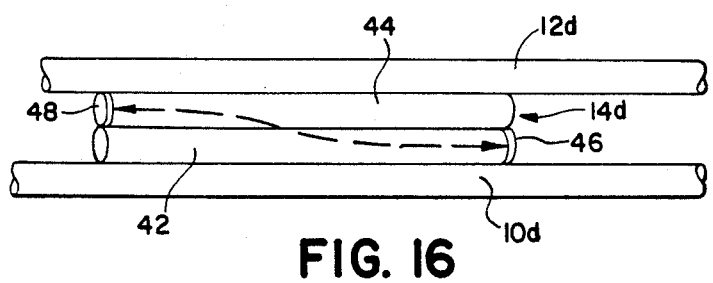
FIG. 16 is a linear version of the hybrid filter of FIG. 13.

A linear (non-loop) version of the dispersive loop resonator 14c of FIG. 13 is shown in FIG. 16 and designated by the reference character 14d. In this embodiment, fiber elements 42 and 44 together define a tuned dispersive couple and resonant cavity. The fiber element 42 has mirror 46 at its right end while fiber element 44 has mirror 48 at its left end to define the appropriate resonant cavity length. The coupling length between the elements 42 and 44 is chosen to give preference to the specific wavelength of interest, so that the two-stage operation is developed. To further sharpen the response of the filter, the non-mirrored ends can be made increasingly lossy to help attenuate the non-desired wavelengths.

The mirrors need not be located as shown. Depending on the length of the dispersive couple, the mirrors can be located on the same fiber or on the right end of upper fiber 44 and the lower end of lower fiber 42. The requisite is that they define an integral number of one-half wavelengths between them for the wavelength of interest.

In FIG. 17 of the drawings, another embodiment of the invention is shown in which a series of spaced linear resonator cavities 114a, 114b, 114c are employed to tap or filter a single-line wavelength to a branch line 112 from a trunk 110. While loop resonators may also be utilized, the resonators 114 of FIG. 17 are linear, Fabry-Perot cavities of the type described above with reference to FIGS. 1–3, each having a length $l_1$, $l_2$, $l_3$ and being spaced from each other by distances $s_1$, $s_2$. As in the prior embodiment, each of the resonators 114 is formed with mirrors at opposite ends although the mirrors are not illustrated as such in FIG. 17. Also, it is to be noted that while only three resonators are illustrated in FIG. 17, it is contemplated that any number of such resonators in excess of one may be used.

To understand the operational principles of the embodiment illustrated in FIG. 17, if it is assumed that the three cavities 114 are identical and further that the trunk 110 and branch 112 have the same phase velocity, and that only a fraction of the energy at a wavelength $\lambda_o$ is transferred into each cavity while the remainder continues along the trunk 110, a beam is sent out of each port in the first cavity of a field strength $E_1$. One of these beams travels to the right on the branch fiber 112 and stays in the same relative phase to the trunk beam $E_o$ as it proceeds. The second cavity (114b) will produce another beam of strength $E_2$ going also to the right in the branch. The beam produced by the second cavity 114 will be in phase with the beam produced by the first cavity 114 in a manner such that they will constructively interfere. The trunk beam will be further reduced in a manner such that each time the tap beam acquires more energy, the trunk beam loses more energy. In this way, a strong transfer is built up from a series of partial transfers. The amplitudes of the signals add, but the energy is proportional to the square of the sum of the amplitudes, or:

Branch Energy $= (E_1 + E_2 + E_3 -)^2$

Therefore, if three equal amplitude transfers are assumed where $E_1 = 0.1E_o$, $E_2 = 0.1E_o$ and $E_3 = 0.1E_o$, then:

Branch Energy $= (0.1 + 0.1 + 0.1)^2 = 0.16 E_o$.

By comparison, the energy after the first cavity 114a is $(0.1)^2$ or $0.01E_o$. Thus, the energy transferred by a series of n partial taps is much greater than n times the energy transferred by the first tap.

Figure 18:
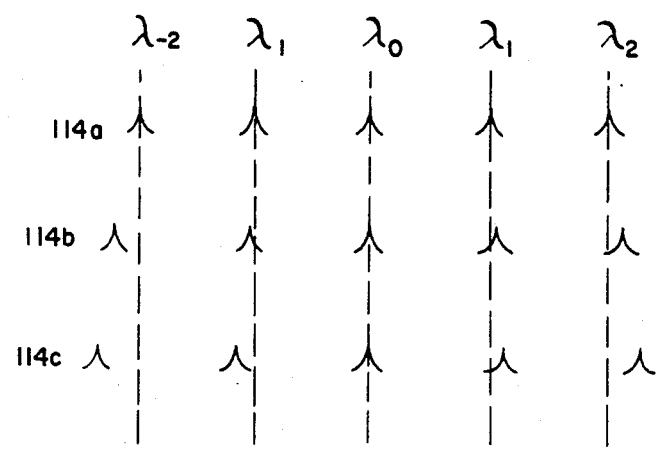
FIG. 18 is a chart depicting the operation of the embodiment of FIG. 17.

In contrast to the assumption that all four resonator cavities are identical, in practice each of the cavities 114 is of a slightly different length (l) so that the spectral lines tapped by each of the cavities do not match, but yet the lengths l of the cavities 114 are selected such that one spectral line ($\lambda_o$) is common to all cavities or resonators. This condition is illustrated in FIG. 18 of the drawings wherein only the wavelength $\lambda_o$ is common to or aligned for all three cavities 114a, 114b and 114c, whereas other wavelengths $\lambda_1$, $\lambda_2$, $\lambda_{-1}$ and $\lambda_{-2}$ do not coincide. As a result of this condition, the wavelength $\lambda_o$ will be transferred from the trunk 110 to the branch 112 with energy equal to $(nk)^2$, where k is the fractional amplitude of the transfer by one of the cavities 114. Thus, if the number of cavities is large enough, a large fraction of the trunk energy at $\lambda_o$ is ultimately tapped off as desired, along with only a very small fraction of the energy of each of the noncoincidence spectral lines (i.e., $\lambda_1$, $\lambda_2$, $\lambda_{-1}$ and $\lambda_{-2}$). Because there are now n times as many as unwanted lines, the ratio of energy in $\lambda_o$ to the sum of the energies in all unwanted lines is improved, but by a factor n, not $n^2$.

A benefit achieved from the filter network of FIG. 17 is that energy traveling to the right in the branch line 112 stays relatively in constant phase relation to the energy of the beam going to the right in the trunk 110 so that the increments of amplitude transfer constructively. However, the phase relation between the left-traveling wave generated by the first cavity and the left-traveling wave generated by the second cavity is displaced in phase by twice the phase length of the fiber between taps. Thus, by adjusting the distance $s_1$, $s_2$ between the taps, a destructive interference is achieved between the left-traveling waves. In this way, the waves traveling to the left in both the trunk 110 and the tap 112 can be nullified at least for any particular wavelength. If there are a large number of cavities, the left-traveling waves will be considerably reduced even though little care is taken to achieve a precise null. In this way, a more efficient transfer of trunk energy at $\lambda_o$ can be achieved by suppressing the transfer into the unwanted ports.

The filter system of FIG. 17 also allows shaping of the spectral transfer. If the filters are not precisely tuned (e.g., in selected length) to $\lambda_o$, then a broader or flatter tap transfer can be achieved, for example. With an increased number of cavities or resonators 114, increased ability for shaping is presented. This shaping, however, is at the expense of decreasing the power in the wanted line $\lambda_o$ relative to the power in the unwanted or noncoincident lines.

In another variation, the trunk line 110 and the branch line 112 may have different physical characteristics so as to be dispersive relative to each other in phase velocity. Assuming a crossover in phase velocity at $\lambda_o$, then the analysis given above will hold for that wavelength, however, wavelengths other than $\lambda_o$ would require different analysis. For example, if all cavities 114 are identical so that all resonant lines in each were coincident constructively, only $\lambda_o$ would still transfer due to the dispersive nature of the lines themselves. Other wavelengths might transfer constructively, however, if the phase length difference between taps is an integral number of wavelengths. Careful spacing $s_1$, $s_2$ between the cavities 114 can be used to decrease constructive interference for all lines except $\lambda_o$ or even to completely nullify all unwanted lines.

The following represents a possible set of parameters for accomplishing the results described in the previous paragraph: Assuming the amplitude transfer to be equal at each cavity, the cavities to be identical, the phase dispersive missmatch along the length of the trunk 110 and the tap 112 between each pair of cavities 114 to be equal, and to be such that for the first side wavelength $\lambda_1$ or $\lambda_{-1}$, n p=2 where n is the number of spaces between the cavities and p is the difference in phase length (at $\lambda_1$, $\lambda_{-1}$) between the trunk line and the branch line, then for the next spectral line $\lambda_2$ or $\lambda_{-2}$, n p=2(2), and at the next succeeding spectral line, $\lambda_3$ or $\lambda_{-3}$, n p=3(2). This will nullify all lines except $\lambda_o$ to the approximation that the relative dispersion is constant as $\lambda$ changes from $\lambda_o$.

Figure 19:
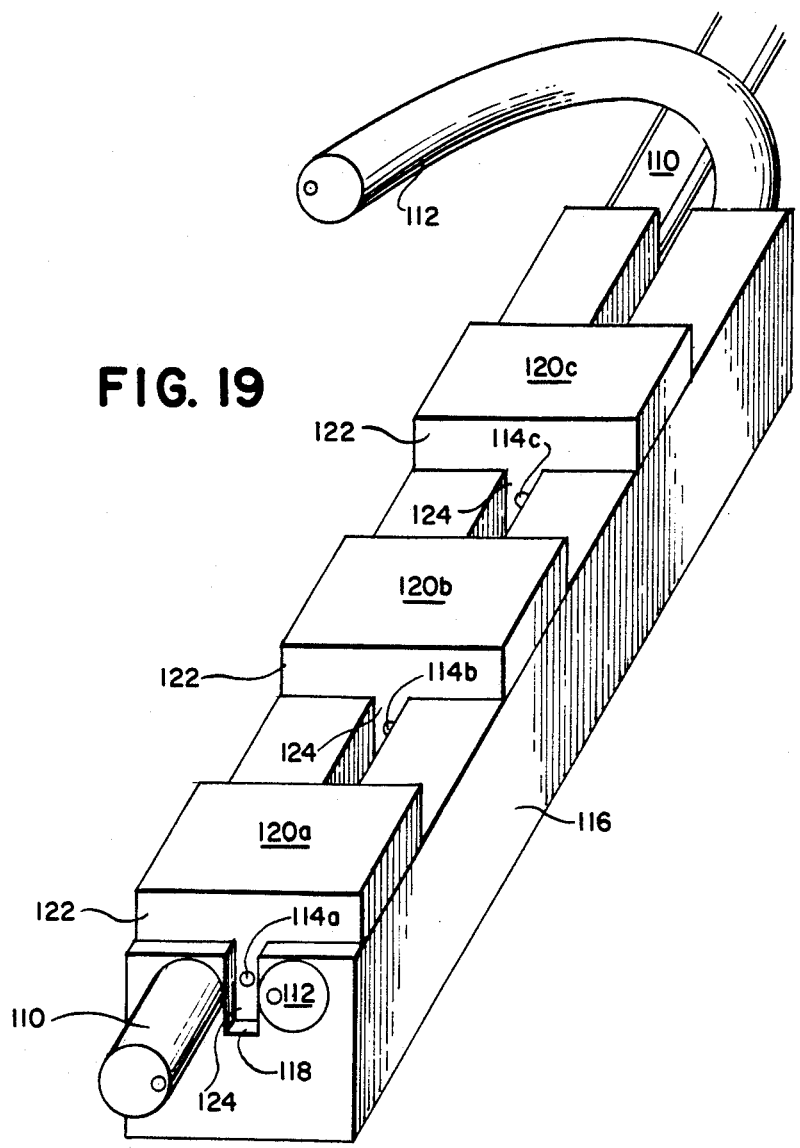
FIG. 19 is a perspective view illustrating a device for practicing the embodiment of FIG. 17.

In FIG. 19, a structure for facilitating practice of the embodiment described with reference to FIGS. 17 and 18 is shown to include an elongated block 116 which may be of glass or of suitable transparent plastic material. The block 116 is formed having a longitudinal channel or recess 118 opening centrally through the top surface thereof. The trunk line 110 previously described with reference to FIG. 17 extends through the block 116 on one side of the slot 118 whereas the branch or tap line 112 extends throughout the length of the block 116 on the other side of the slot 118 from the trunk line 110. The cores of both the trunk 110 and of the tap 114 are proximate to the sides of the slot 118 as shown in FIG. 19.

A plurality of T-shaped blocks 120, each having a cross-portion 122 and a depending leg portion 124, are adapted to fit into the slot 118 and to be adjusted slidably longitudinally of the block 116. The leg portion 124 of each block 120 supports each resonator 114 as described with reference to FIG. 17, at a position between and in the same horizontal plane of the cores of the trunk 110 and the tap 112. As a result of this organization, it will be appreciated that the length of each block 120 will determine the length of each resonator 114 and the spacing between the several resonators may be adjusted precisely by sliding the blocks 120 along the block 116 in the slot 118 thereof. The operation of the device shown in FIG. 19 is otherwise the same as that described above with reference to FIGS. 17 and 18.

Figure 20:
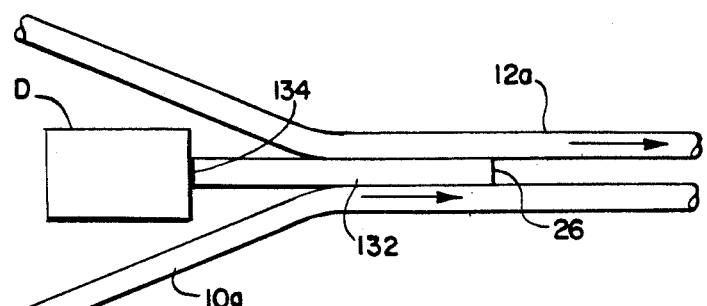
FIG. 20 is a diagrammatic side elevational view of a filter arrangement employing amplification.

As previously noted, amplification can be provided in the cavity filter of the present invention. Thus, as shown in FIG. 20, a laser diode D is coupled to a resonant cavity 132 to amplify the signals therein. The cavity 132 is identical to that of FIG. 1, but made of active gain material, for example, a neodymium doped glass, and with one mirror 134 of reduced opacity to permit input of the light energy from the diode D. The mirror 134 may be dichroic to input the laser output while reflecting the signal frequencies. The diode is driven at a low level at the pumping frequency of the gain material, for example, at 0.82 $\mu$m to produce amplification within the cavity wavelengths near the lasing frequencies, for example, 1.06 and 1.34 $\mu$m. Consequently, as noted previously with regard to FIG. 4, only a small portion of the energy in the trunk need be transferred to the cavity (for example by a low percentage couple as shown in FIG. 6) where it is then amplified and then transferred to the branch fiber 12a through a higher percentage couple as shown in FIG. 5.

Figure 21:
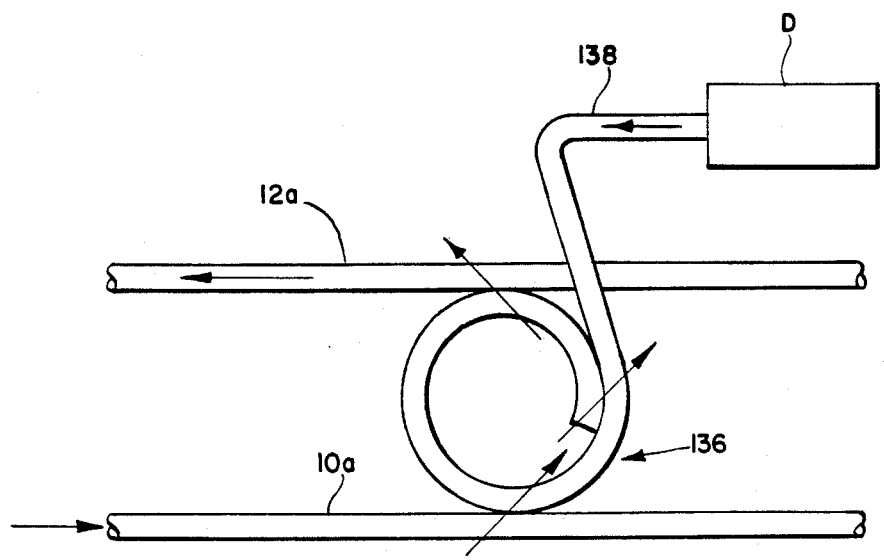
FIG. 21 is a diagrammatic side elevational view of a loop resonator employing amplification.

Both butt coupling and lateral coupling of the driving source D to the cavity may be employed. For example, as shown in FIG. 21, the diode D is laterally coupled to a ring resonator 136 by means of a coupling branch 138. In this arrangement, the cavity system may be identical to that of FIG. 4, but with the ring cavity 136 made of active gain material.

Amplification of the tapped energy can also be provided by stimulated Raman scattering and stimulated Brillouin scattering, in which case the cavity fibers of FIGS. 20 and 21 are not specially constructed of gain material, but of conventional fiber materials as previously noted in FIGS. 1 and 4, for example. For Raman effect amplification, the diode D introduces light energy into the cavity to cause amplification by Raman stimulation. For fused silica and germania, both preferred materials for optical communication fibers, the Raman cross-section is relatively wide such that a given pump or amplifier frequency can amplify a range of frequencies. Further disclosure relating to techniques for effecting optical amplification by the Raman effect is presented in copending U.S. patent application Ser. No. 536,655, filed Sept. 28, 1983 and entitled OPTICAL COMMUNICATIONS SYSTEM USING RAMAN REPEATERS AND COMPONENTS THEREFOR, the disclosure of which is incorporated herein by reference.

In a practical system, the losses in the cavity 10 will be largely mirror end losses (except for the ring cavity) and will be 1-5% per cavity round trip. In a cavity operating in the one micron wavelength region near cut-off with a numerical aperture of approximately 0.2, the peak Raman gain in silica is about 60 decibels per kilometer per watt of pump power. As a 1% loss is 1/25 decibel, 1/1500 watt kilometer or 1/15 watt meter is needed to offset a 1% loss.

In the case of ring cavities, the round trip losses can be reduced to 1/10% by careful end coupling. That is, a high efficiency end coupling increases the finesse of the resonant ring and decreases the losses to be made up, bringing the requirement to approximately 1/150,000 watt-meters. If this latter system is operated in the oscillating mode, the pull of the Raman gain curve on the resonant lines can be reduced by flattening the Raman gain. This can be accomplished, as described in detail in the above-noted application Ser. No. 536,655, by using two or more pump lines disposed relative to the branch line so that the composite gain is flat in the region of the branch line frequencies. Brillouin gain can also be used subject to the limitations imposed by the sharpness of the Brillouin gain curve. Again, double or multiple pump lines can be used to create a flatter composite gain curve, but one is limited in any case to a narrow dynamic range.

Figure 26:
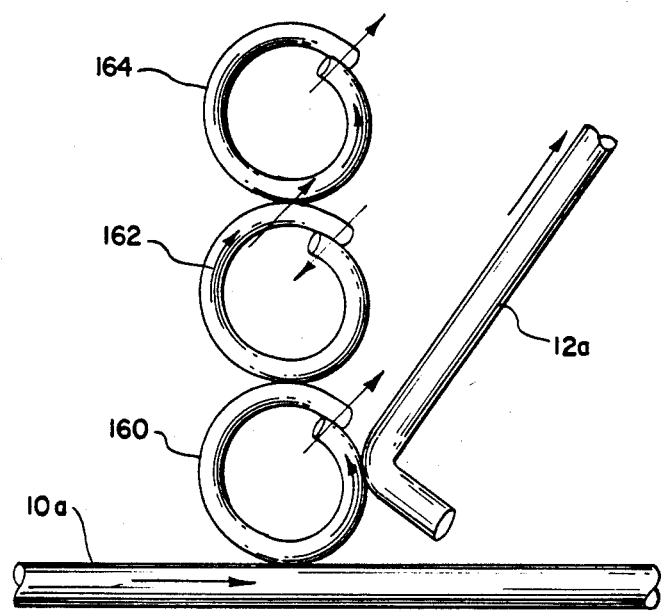
FIG. 26 schematically illustrates an embodiment of a closed loop, three stage resonant cavity filter according to the present invention.
Figure 26A:
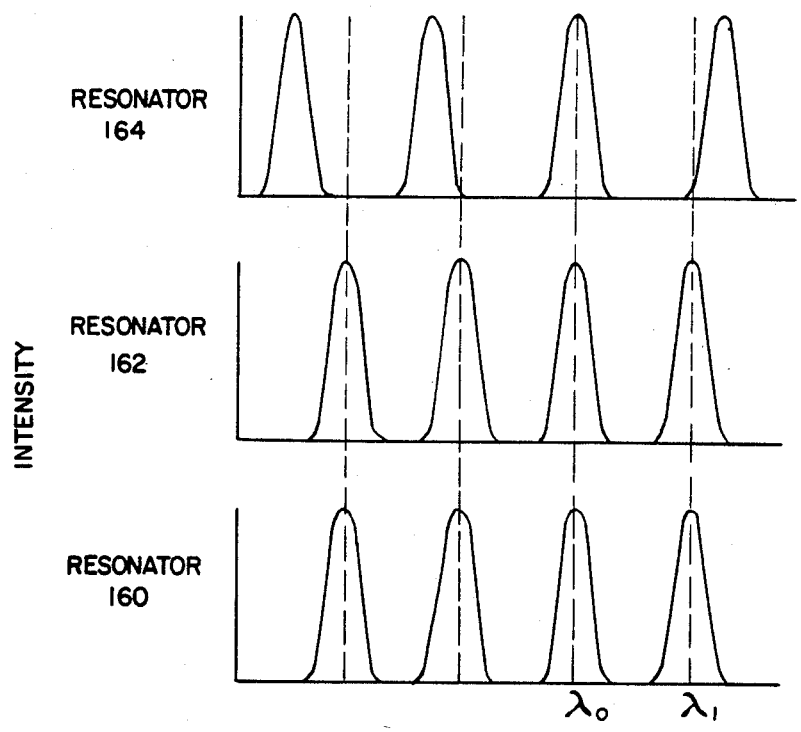
FIG. 26A is graphical display of the frequencies operative in each of the three filter cavities of FIG. 26.

In addition to the two stage filters previously discussed three stage resonant cavity filters can also be utilized as shown in FIG. 26.

Referring to the showing of FIG. 26, consider third loop filter 164 first. It is resonant at $\lambda_o$. Suppose energy coupling coefficient from second filter 162 to third filter 164 is 0.01, and suppose the losses in third filter 164 are 0.01 per revolution. At resonance, all the energy from first filter 160 is coupled into third filter 164. That is, the coupling from filter 162 to filter 164 becomes 1.0 instead of 0.01. Filter 162 is at resonance at $\lambda_1$, but by our equation given previously, the energy coupled out of filter 164 by filter 162 is 0.01 because of the large coupling from filter 162 to filter 164. In fact filter 162 appears to be broken at the intersection with filter 164. If the coupling from filter 160 to filter 162, at resonance is only 0.01, 16% of $\lambda_o$ is coupled into the useful output. At $\lambda_1$, filter 164 is not resonant. Therefore, the coupling from filter 162 to filter 164 is approximately 0.01. Filter 162 is resonant to $\lambda_1$. Therefore, the energy coupled from filter 160 to filter 162 is $$\frac{4(1)}{(1+1)^2} = 100\%$$

Therefore, although filter 160 is nominally resonant, it appears to be broken at the junction with filter 162 and so cannot resonate and draws off only about 0.2% of $\lambda_1$, from the trunk. It is to be noted that output fiber 10 is coupled to filter element 60 below the area of end overlap.

The coupling of $\lambda_o$ can be increased into the proper output by increasing the coupling from trunk 10a onto filter 160. However, that increases the base line, off-resonance coupling of every channel into filter 160. The limit to this is set by the number of filters we intend to put on the trunk line. The value of 0.2% allows perhaps 500 to 2,000 filters on the trunk. This base line off-resonant poaching is not nearly so damaging as the resonant adjacent order poaching encountered before, because this energy loss depended on whether some filter upstream was tuned to a certain $\lambda$. In other words, the variability and unpredictability of the energy delivered to the nth filter was more damaging than the low energy level.

Figure 27:
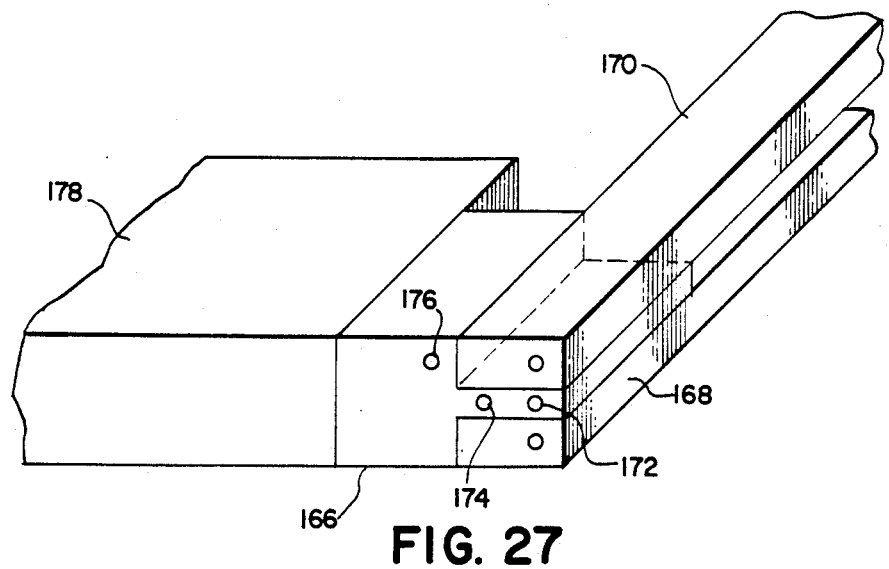
FIG. 27 illustrates a three cavity resonator filter employing linear, non-closed loop cavities.

The straight cavity embodiment of this three-stage filter is shown in FIG. 27. This explanation is the same as for the loop cavity. Three cores 172, 174 and 176 have been placed in one fiber (shown as block/166) to accomplish this version. Thus, a fiber preform is formed having the three cores within conventional cladding, then drawn and cut, polished and end coated to form block 166.

Both ends of the filter block 166 are reflective. A cross-section has been shown, with the trunk and branch fibers 168 and 170 passing through in the Z direction. The branch or output fiber 170 originates at the first face of the filter block 166 and goes on indefinitely in the Z direction.

First filter 172 and second filter 171 have been shown on the X axis of the array, with third filter 176 displaced in the Y dimension. This is done to illustrate a tuning scheme. The rather large member shown as a "tuning block" 178 extends a few inches in the X-Z dimension. So it can be easily bent in the X-Z plane, or in the Y-Z plane, or both.

The block is much wider in X than shown, but only as thick as the fiber assembly. The geometry is such that when there is a bend in the Y-Z plane, the zero stress line lies along 172, 174 in the Z dimension. Thus, a bend leaves filters 172 and 174 unchanged and compresses third filter 176. In this way, the filter resonant lines of filter 176 are shifted relative to those of first and second filters 172 and 174. In the X-Z, the tuning block is so thick that for practical purposes, a bend in that dimension stretches all three filter elements. This rather exacting geometry is required only for simplicity of explanation. With this device, one can tune to any wavelength by a combination of bends in two dimensions. Motion in Y-Z tends to tune to the 0 line, 100, 200, 300, etc. And in the X-Z dimension to tune from 1 to 2 to 3, or 101 to 102 to 103 etc. This is approximated in the invention device.

This is one of many tuning possibilities. In these cavity devices, resonance is a function of $n \cos(\theta L/\lambda)$ where n is index of refraction, $n \cos \theta$ is the propagation constant and L is the physical length of the device. So, for a given percentage change in n, there is a corresponding percentage change in $\lambda$.

Thus, it will be appreciated that as a result of the present invention, a highly effective resonant cavity filter system is provided by which narrow wavelengths of light energy may be tapped from a trunk line to each of a series of taps or branch lines and by which the aforementioned objectives are completely fulfilled.

It will be apparent to those skilled in the art and is contemplated that modifications may be made in the embodiments illustrated and described herein without departure from the invention. Accordingly, it is expressly intended that the foregoing description and accompanying drawing illustrations are representative of preferred embodiments only, not limiting, and that the true spirit and scope of the present invention will be determined by reference to the appended claims.

What is claimed is:

1. A filter system for coupling an input optical waveguide to an output optical waveguide, said system comprising a resonant waveguide cavity formed with a dispersive couple providing a wavelength dependent filter whereby the effective length of said cavity determines a plurality of resonant wavelengths and said dispersive couple is more selective of one of said resonant wavelengths.

2. The filter system of claim 1 wherein said cavity comprises first and second optical waveguide segments with at least one dispersive coupling therebetween.

3. The filter system of claim 2 wherein said input waveguide is laterally coupled to said first optical waveguide and wherein said output optical waveguide is lateraly coupled to said second optical waveguide.

4. The filter system of claim 2 wherein said first and second optical segments are linear segments disposed generally parallel to and coupled to each other.

5. The filter system of claim 4 wherein said first optical segment includes a reflective arrangement at one end and said second optical segment includes a reflective arrangement at an end opposite from said one end of said first segement to provide a resonant cavity whose length is twice the distance from said one end of said first segment to said opposite end of said second segment.

6. The filter system of claim 3 wherein said first and second optical segments together define a closed-loop cavity formed by opposite ends of one of said segments being coupled to opposite ends of the other of said segments.

7. The filter system of claim 6 wherein the effective lengths of said first and second segments are such that essentially all energy for a select wavelength is transferred between said segments at each of said couplings to provide a continuous closedloop path for said select wavelength.

8. An optical filter system for transferring light energy from an input optical waveguide to an output optical waveguide, said system comprising a block of optical waveguide material drawn with a plurality of optical fibers embedded therein extending along a given axis thereof, at least a given portion of said block having a pair of generally parallel end faces extending normal to said axis and in intercepting relation to one or more of said embedded optical fibers, and reflective means located at each end of said given portion of said block to form a linear optical resonator cavity comprising at least one of said embedded fibers.

9. The invention of claim 8 including coupling means formed in said block for facilitating the lateral coupling of said input and output waveguides to select ones of said embedded fibers.

10. The invention of claim 9 wherein said input and output waveguides are fibers and said coupling means includes at least one indentation formed in said block in close proximity to at least one of said embedded fibers for receiving at least one of said input and output waveguides.

11. An optical filter system for transferring at least one select wavelength of optical energy from an input optical waveguide supporting a broad range of wavelengths within a given wavelength band to an output optical waveguide, said system comprising an optical waveguide filter coupled to said waveguides, said filter having an optical waveguide resonator arrangement for resonating a plurality of wavelengths within said given band including said select wavelength and said resonator arrangement including wavelength dependent means for discriminating against unwanted wavelengths and for preferentially resonating said select wavelength for transfer to said output waveguide whereby energy of said select wavelength is transferred thereto and other wavelengths within said input waveguide are relatively uneffected.

12. The system of claim 11 wherein said wavelengths dependent means comprises a dispersive couple providing a wavelengths dependent filter.

13. The system of claim 12 wherein said resonator arrangement includes a waveguide loop closed by said dispersive couple.

14. The system of claim 11 wherein said resonator arrangement includes at least one resonator cavity coupled to said output waveguide near a proximate end thereof, and said output waveguide includes reflective means located at said proximate end for reflecting energy directed toward said proximate end.

15. The system of claim 11 wherein said resonator arrangement includes a pair of waveguide resonators intercoupled to each other, and said wavelength dependent means being defined by each of said resonators having a different effective length to resonate at different groups of wavelengths but with said one select wavelengths being generally coresonant in both said resonators.

16. The filter system of claim 15 wherein said resonators are integrally formed with one of said resonator including portions of the other of said resonators.

17. The filter system of claim 16 wherein said one resonator is coupled to said input waveguide.

18. The filter system of claim 17 including means for providing amplification in one of said resonators.

19. The filter system of claim 16 wherein said other resonator is a first waveguide segment formed as a first closed loop and said one resonator is a second waveguide segment coupled to said first closed loop at two spaced apart points with the waveguide portion between said spaced points and portions of said first closed loop form a second closed loop resonator.

20. The filter system of claim 19 wherein said waveguide portion between said spaced points is coupled to said input waveguide.

21. The filter system of claim 19 wherein said second waveguide segment is coupled to both said input and said output waveguide.

22. The filter system of claim 19 wherein said waveguide portion between said spaced points is coupled to both said input and output waveguides with said output waveguide spaced downstream of said input guide as viewed in the direction of travel of the wave input to said second loop by said input waveguide.

23. The filter system of claim 22 including amplifying means for providing gain in said second loop.

24. The filter system of claim 23 wherein said amplifying means includes means for injecting light energy in one end of said second segment forming said second loop.

25. The filter of claim 15 wherein said resonators are formed as at least two fiber cores spaced apart within a single cladding arrangment to form multiple resonators within an integral multiresonant cavity waveguide.

26. The filter of claim 25 wherein said resonators are formed as preform cores spaced apart within a single cladding arrangment and drawn down to form said multiple resonators in one waveguide.

27. The system of claim 11 including means for providing amplification in one of said resonators.

28. The system of claim 11 wherein said resonators are waveguide loops formed of optical fibers, and the diameter of said loops is from about 0.5 to 5.0 cm.

29. The system of claim 11 wherein said resonators are intercoupled to each other through an intermediate waveguide section.

30. An optical waveguide fiber cavity comprising an optical fibers segment of fixed length having substantially parallel end faces and a longitudinally extending optical fiber core surrounded by cladding material, said segment having opposed, longitudinally extending flats to provide reduced cladding thickness between the core and the surface of the flats for enhanching lateral coupling there at, and reflective means located at each of said end faces to effect an optical resonant cavity.

31. The cavity of claim 30 wherein said end faces of said segment are mirrored for providing said reflective means.

32. An optical waveguide cavity arrangement comprising at least a pair of resonant cavities formed of optical waveguides with the optical path of one of said cavities including a waveguide section forming a portion of the optical path of the other of said cavities whereby the resonance of each of said cavities is interrelated.

33. The cavity of claim 32 wherein said one cavity is a loop cavity formed by a waveguide segment coupled at spaced apart points to said waveguide section of said other cavity so as to form a closed loop which includes portions of said other cavity.

34. The cavity of claim 33 wherein said other cavity is also a resonant loop with said segment coupled to generally opposing sides thereof.

35. An optical filter system comprising an elongated input optical waveguide mounted in generally spaced parallel relation to an elongated output waveguide to define an elongated gap therebetween, a plurality of optical waveguide resonator arrangements located along said elongated gap and coupled to said input and output waveguides so as to transfer energy from said input to said output waveguide at the location of each resonator arrangement, and said resonator arrangements are located along said gap in relation to each other such that energy transferred to the output waveguide for travel in a backward direction opposite to the flow of energy in said input waveguide is different in phase from one resonator arrangement to another so as to reduce such backward flowing energy.

36. The system of claim 35 wherein the phase between energy transferred in a backward direction by a first resonator arrangement is displaced from that transferred by second resonator arrangement by approximately twice the phase length of the section of output waveguide between the couplings of said first and second resonator arrangements to provide destructive interference between the backward directed energy transferred thereby.

37. The system of claim 35 wherein said input and output waveguides are optical fibers, and said system includes a body for supporting linear portions of the output and input fibers in spaced parallel relation, said body carrying a longitudinal recess between said input and output fibers, and said system including means receivable in said recess for supporting said resonators adjustably along said slot, said means for supporting said resonators comprising a plurality of blocks having at least a portion conforming to and receivable in said slot with one of said resonators being supported in each said block portion.

38. The system of claim 37 wherein each said block portion has a pair of generally parallel end faces as measured along the axis of said reecess, a waveguide fiber extending between said end faces, and a mirror arrangement on said end faces to provide a linear resonant cavity extending within said block portion.

39. The system of claim 38 wherein said body provides a resonantor support surface adjoining an exterior end of said recess, and each said block is T-shaped, having a depending leg providing said block portion such that each said T-shaped block is configured to be supported on said resonator support surface of said body with its depending, resonator carrying leg carried within said slot for adjustment of its location therealong.

40. An optical filter system comprising an input optical waveguide, an output optical waveguide, a waveguide cavity resonator coupled to said input and output waveguides so as to transfer from said input to said output waveguide wavelengths resonant in said resonator, said resonator being laterally coupled to said output waveguide near a proximate end thereof such that transferred energy in said output waveguide is directed both toward and away from said proximate end, and said output waveguide including a reflective arrangement at its said proximate end to reflect energy directed toward said end to increase the energy in said output waveguide which is directed away from said proximate end.

* * * * *